Figure 3:
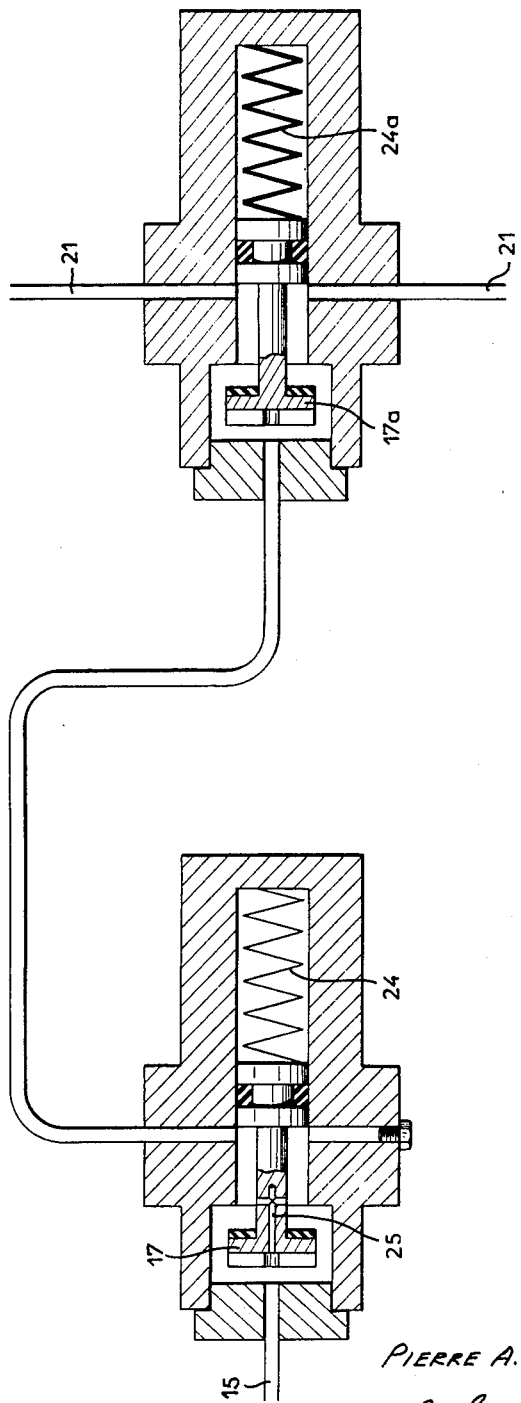

July 12, 1966 P. A. G. LEPELLETIER 3,260,557
DEVICE FOR PREVENTING LOCKING OF THE REAR BRAKES
OF AN AUTOMOBILE VEHICLE
Filed Feb. 27, 1964 3 Sheets-Sheet 1
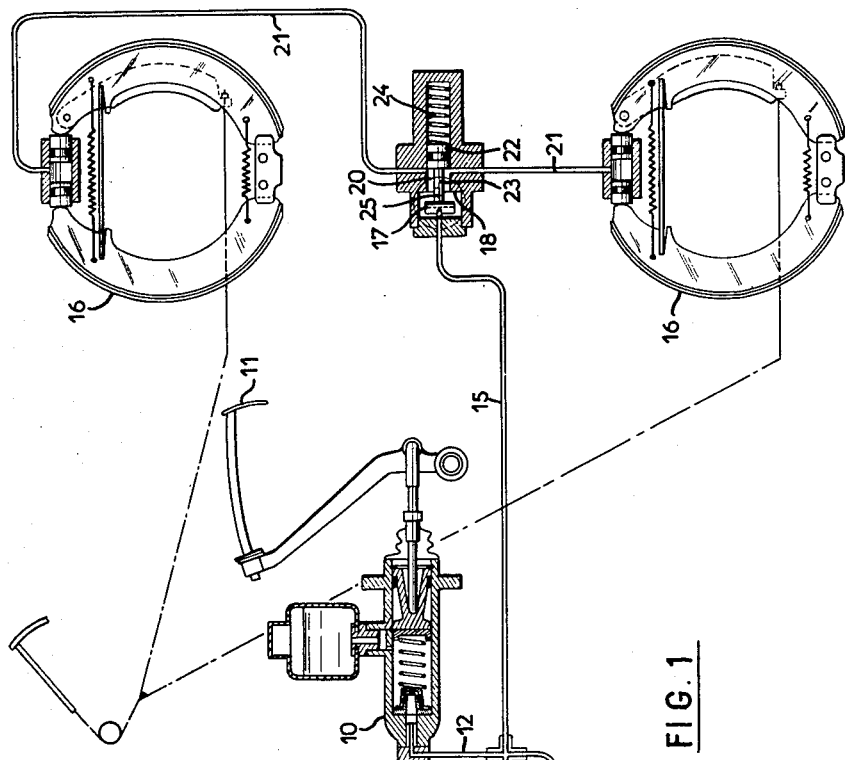
FIG. 1
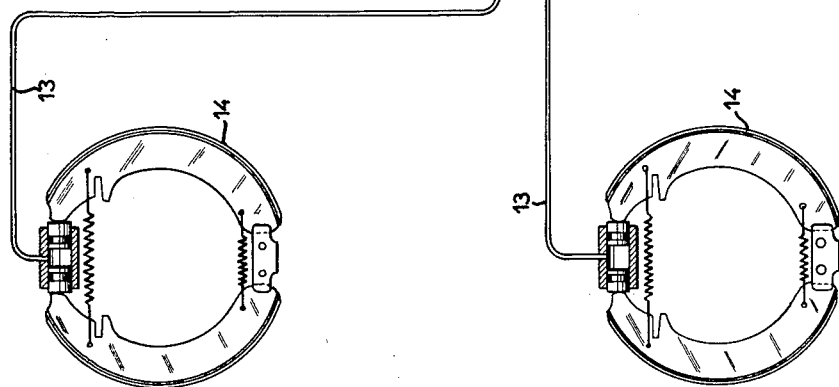
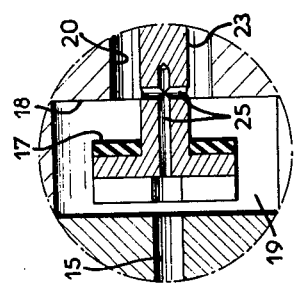
FIG. 2
INVENTOR
PIERRE A. G. LEPELLETIER
By Irwin S. Thompson
ATTY.

INVENTOR
PIERRE A. G. LEPELLETIER
By Irwin S. Thompson
ATTY.

United States Patent Office 3,260,557
Patented July 12, 1966

3,260,557
DEVICE FOR PREVENTING LOCKING OF
THE REAR BRAKES OF AN AUTOMOBILE
VEHICLE
Pierre André Georges Lepelletier, Chatou, France, assignor to Societe Anonyme Francaise du Ferodo, Paris, France, a corporation of France
Filed Feb. 27, 1964, Ser. No. 347,788
Claims priority, application France, Mar. 6, 1963, PV 926,969
1 Claim. (Cl. 303—49)

If while braking an automotive vehicle, the rear brakes of the vehicle become locked, this may result in a loss of control of the steering which, in the worst case, causes a complete slewing around of the vehicle.

In order to avoid such an accident, it has already been proposed to interpose a spring-loaded valve in the hydraulic supply circuit of the rear brakes, this valve being acted on by the pressure developed in this supply circuit so as to close against the action of the said spring when the said pressure exceeds a limit fixed by the calibration of the said spring.

As will readily be understood, this calibration corresponding to a limit of safety must be made relatively high, failing which the rear brakes would become inadequate and would reduce the braking capacity of the vehicle.

Tests carried out by the applicant have made it possible to show that the effectiveness of such valves, under these conditions, is only evident during the course of braking at average or moderately strong intensity, but not during extremely hard braking at high speed, which may be the case when trying to avoid an unforeseen collision. Now, it is precisely in this latter case that the locking of the rear wheels presents the greatest danger. Tests have shown that when braking very hard at high speed, the vehicle is first subjected, during the first few tenths of a second, to a fore-and-aft pitching movement of short duration. During this movement, however brief it may be, the rear wheels are permitted to leave contact with the ground, which causes locking of the rear brakes, even if their supply circuit is provided with a valve of the kind above-referred to. From this time onwards, the rear brakes are not released, remain locked, and there is a risk of complete slewing around of the vehicle.

The present invention has for its object a device which prevents locking of the rear wheels on an automotive vehicle, and which is not subject to the above disadvantage.

According to the invention, a permanent passage having a high pressure drop is formed in the valve, and the spring of the said valve is calibrated to a low value such that the valve closes from the beginning of the braking action. Thus, the locking of the rear wheels is prevented during the initial pitching movement, while at the same time the pressure is then allowed to increase progressively in the rear brakes, so that the total braking capacity of the vehicle is kept at its highest possible value.

According to the invention, this arrangement may be adopted either separately or in combination with a valve of known type. In this case, the valve with a permanent passage with a high pressure-drop and a weak spring is mounted in series with another valve which has no permanent passage and which has a stronger spring.

Figure 4:
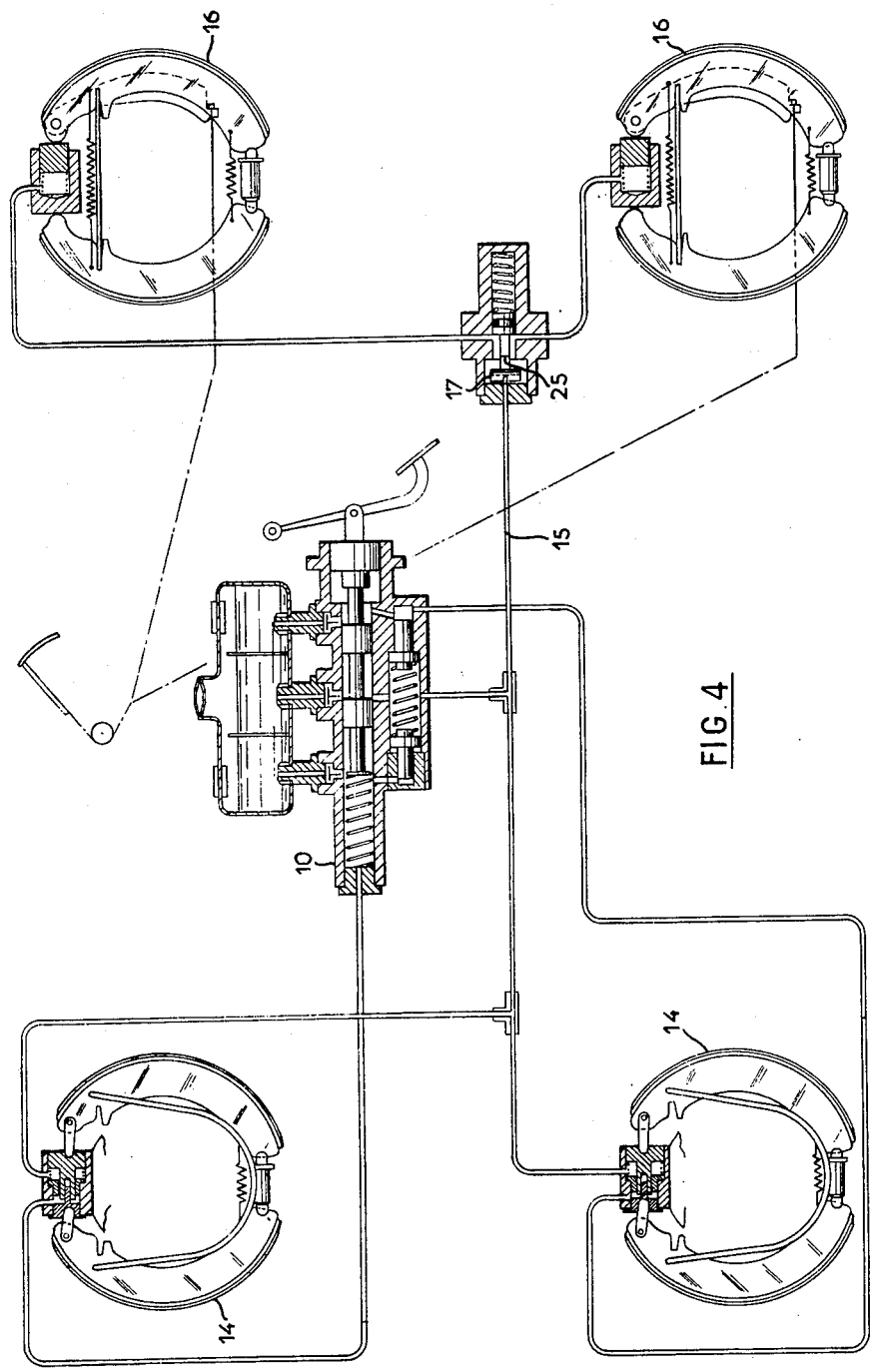

The characteristic features and advantages of the invention will be further brought out in the description which follows of forms of embodiment selected by way of example, reference being made to the accompanying drawings, in which:

FIG. 1 is a diagram of the braking installation of an automotive vehicle provided with a device in accordance with the invention;
FIG. 2 shows a detail of this device on a larger scale;
FIG. 3 shows an alternative embodiment;
FIG. 4 shows a further embodiment.

Reference will first be made to FIG. 1, in which there is shown at 10 a master-cylinder of the usual type, which is actuated by a pedal 11 and is connected to a conduit 12. This conduit is coupled to two conduits 13 which supply the front brakes 14, and to a conduit 15 which supplies the rear brakes 16.

A device for preventing locking of the rear brakes 16 is interposed in the conduit 15 and comprises a valve 17 (FIGS. 1 and 2) which co-operates with an annular seat 18.

The seat 18 is formed in a chamber 19 which communicates with the conduit 15, and in which the valve 17 is housed. The seat 18 surrounds a bore 20 which communicates with the conduits 21 coupled to the rear brakes 16, and in which slides a piston 22 coupled by a rod 23 to the valve 17. The valve 17 tends to close against the seat 18 by the action of the pressure produced by the conduit 15, and tends to be lifted from the seat 18 by a spring 24.

According to the invention, a passage 25 having a high pressure-drop (FIG. 2) is formed in the valve 17 and the rod 23 so as to form a permanent communication between the conduit 15 and the conduits 21. In addition, the spring 24 is calibrated to a low value, such that the valve 17 closes against the seat 18 from the beginning of the rise in pressure in the conduit 15, that is to say from the beginning of the braking action.

The rear brakes 16 are thus prevented from being locked during the pitching movement which may follow a very hard braking action. It will however be noted that the pressure is then allowed to increase gradually in the rear brakes 16 through the passage 25, so that the total braking capacity is kept as high as possible.

In the alternative form shown in FIG. 3, the conduit 15 is provided with a valve 17 such as that which has just been described, that is to say with a permanent passage 25 having a high pressure-drop and with a weak spring 24, in series with a second valve 17a which has no permanent passage and in which the spring 24a is more powerful.

The invention may be applied to braking installations on vehicles of various types. For example, there is shown in FIG. 4 an application to an installation of the type described in U.S. Patent No. 3,044,581. There will be recognized in FIG. 4 the front brakes 14 and the rear brakes 16. The device comprising the valve 17 and the passage 25 is always provided in the supply conduit 15 for the rear brakes.

The invention is of course not limited to the forms of embodiment described and shown, but includes all its alternative forms.

What I claim is:

A device for preventing locking of the rear brakes on an automotive vehicle having a hydraulic circuit for the operation of the rear brakes, comprising a first valve in said circuit for opening and closing said circuit, means for applying the fluid pressure of said circuit to said first valve to urge said first valve toward closed position, a spring continuously urging said first valve toward open position with a force substantially less than the force that urges the first valve closed when high braking force is applied, means defining a passage of constant diameter and length past said first valve in at least said closed valve position, said passage offering substantially more resistance to the flow of hydraulic fluid than the open first valve, a second valve in series with said first valve in said circuit, means for applying the fluid pressure of said circuit to said second valve to urge said second valve toward closed position, said second valve having no bypass, and a second spring continuously urging said second valve toward open position with a force substantially greater than said force of said first spring.

References Cited by the Examiner

UNITED STATES PATENTS

| | | | |
|---|---|---|---|
| 1,460,164 | 6/1923 | Loughead | 188—152 |
| 1,860,406 | 5/1932 | Chevillot et al. | 303—84 |
| 2,189,224 | 2/1940 | Roberts | 188—152 |
| 2,997,059 | 8/1961 | Mortimer | 303—84 X |

EUGENE G. BOTZ, *Primary Examiner.*